(12) United States Patent
Appel et al.

(10) Patent No.: US 9,433,885 B2
(45) Date of Patent: Sep. 6, 2016

(54) SYSTEMS AND METHODS FOR REMOVING COMPONENTS OF A GAS MIXTURE

(75) Inventors: Aaron M. Appel, Richland, WA (US);
James J. Strohm, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1075 days.

(21) Appl. No.: 13/440,683

(22) Filed: Apr. 5, 2012

(65) Prior Publication Data
US 2013/0266498 A1 Oct. 10, 2013

(51) Int. Cl.
*B01D 53/62* (2006.01)
*B01D 53/96* (2006.01)
*B01D 53/14* (2006.01)

(52) U.S. Cl.
CPC ....... *B01D 53/1425* (2013.01); *B01D 53/1475* (2013.01); *B01D 53/62* (2013.01); *B01D 53/96* (2013.01); *B01D 53/965* (2013.01); *B01D 2251/2062* (2013.01); *B01D 2251/604* (2013.01); *B01D 2252/102* (2013.01); *B01D 2252/60* (2013.01); *B01D 2255/104* (2013.01); *B01D 2255/20738* (2013.01); *B01D 2255/20746* (2013.01); *B01D 2255/20753* (2013.01); *B01D 2255/20761* (2013.01); *B01D 2255/20792* (2013.01); *B01D 2257/504* (2013.01); *B01D 2258/0283* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| 2,047,550 A | 7/1936 | Dely |
| 2,693,446 A | 11/1954 | Van Krevelen |
| 5,658,545 A * | 8/1997 | Chang .................... B01D 53/56 423/239.1 |
| 8,137,527 B1 | 3/2012 | Woods |
| 2011/0186441 A1 | 8/2011 | LaFrancois et al. |

OTHER PUBLICATIONS

WO PCT/US13/033568 Search Rep., Jul. 12, 2013, Battelle Memorial Institute.
WO PCT/US13/033568 Written Op., Jul. 12, 2013, Battelle Memorial Institute.
WO PCT/US13/033568 IPRP, Oct. 7, 2014, Battelle Memorial Institute.

* cited by examiner

*Primary Examiner* — Daniel Berns
(74) *Attorney, Agent, or Firm* — Wells St. John P.S.

(57) ABSTRACT

A system for removing components of a gaseous mixture is provided comprising: a reactor fluid containing vessel having conduits extending therefrom, aqueous fluid within the reactor, the fluid containing a ligand and a metal, and at least one reactive surface within the vessel coupled to a power source. A method for removing a component from a gaseous mixture is provided comprising exposing the gaseous mixture to a fluid containing a ligand and a reactive metal, the exposing chemically binding the component of the gaseous mixture to the ligand. A method of capturing a component of a gaseous mixture is provided comprising: exposing the gaseous mixture to a fluid containing a ligand and a reactive metal, the exposing chemically binding the component of the gaseous mixture to the ligand, altering the oxidation state of the metal, the altering unbinding the component from the ligand, and capturing the component.

6 Claims, 4 Drawing Sheets

SYSTEMS AND METHODS FOR REMOVING COMPONENTS OF A GAS MIXTURE

STATEMENT AS TO RIGHTS TO INVENTIONS MADE UNDER FEDERALLY-SPONSORED RESEARCH AND DEVELOPMENT

This invention was made with Government support under Contract DE-AC05-76RLO1830 awarded by the U.S. Department of Energy. The Government has certain rights in the invention.

TECHNICAL FIELD

The technical field relates to removal of components from gas mixtures, particularly, in certain embodiments the removal of carbon dioxide from gas mixtures, including the removal and/or capture of carbon dioxide from gas mixtures such as effluent gasses from combustion processes, for example.

BACKGROUND

As part of the combustion process, gasses such as carbon dioxide ($CO_2$) are generated. This $CO_2$ gas is generated in the form of, or can be a component of a gaseous mixture. These gaseous mixtures can include effluent mixtures such as combustion products from coal combustion or any other petroleum based combustion process.

It has become more important in recent years to isolate this $CO_2$ and prevent it from being transferred to the atmosphere. There are concerns that the generation of and transfer of $CO_2$ into the atmosphere can lead to global warming, which may have a detrimental effect upon the global environment. The present disclosure provides systems and methods for removing components of gas mixtures.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
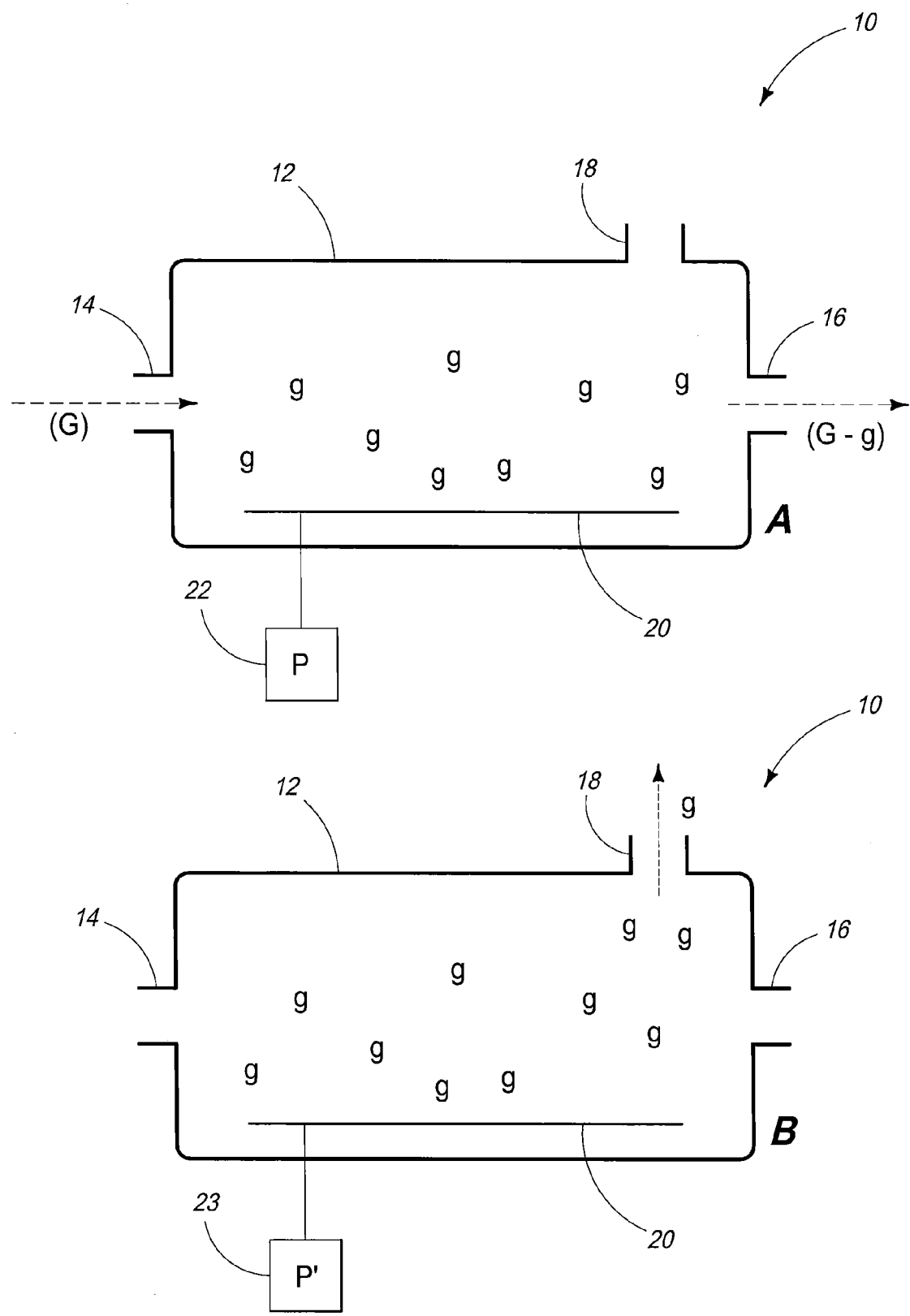
FIGS. 1A-1B are embodiments of a system in two configurations for removing components of a gas mixture according to an embodiment.

The systems and methods will be described with reference to FIGS. 1A-4C. Referring first to FIG. 1, a system 10 is shown as configured in FIG. 1A having a housing 12 and inlet port 14 and outlet ports 18 and 16, for example. Housing 12 as well as the accompanying inlets and outlets can be manufactured of a non-conductive material, such as glass and/or plastic for example. Housing 12 can be configured to contain a solution such as a fluid including, but not limited to, an aqueous fluid for reaction with a gaseous mixture (G) to be received through inlet 14.

Outlet 16 can be configured to allow for unreacted gas to pass through and exit system 10. The gaseous mixture (G) can be less a gaseous component (g) which can be retained within system 10, for example. System 10 can further include an electrode 20 that can be coupled to a power source 22. In one example, the electrode 20 can be utilized to change the oxidation state of metals within the solution within system 10.

According to an example implementation in one configuration such as FIG. 1A, gas as a gaseous mixture (G) can be provided to system 10 and the gas (G-g) less a component (g) of the gas mixture can exit through outlet 16. According to an example implementation, electrode 20 can be coupled to a power source 23 and altered to change the oxidation state of metals within the solution within system 10 as shown in FIG. 1B, for example. In this configuration, the oxidation state of the metal is changed, thereby allowing the trapped component such as (g) within the solution to be released from system 10, exiting outlet 18, for example.

As shown, system 10 can include a reactor fluid containing vessel having housing 12, and system 10 can have conduits extending therefrom. System 10 can have a solution within the reactor, and this solution can contain a ligand and a metal, for example. There can be at least one reactive surface within the vessel, the reactive surface coupled to a power source, as an example, the reactive surface can be electrode 20.

In accordance with example implementations, the ligand within the solution can be $NH_3$, OH, and/or an alkoxide. The ligand can be present in the solution in an amount from about 0.1 to about 30 wt %. Further, the metal within the solution can be one or more of Cu, Ag, Fe, Ni, Co, and/or Zn. The metal within the solution can be present in an amount from about 0.1 to about 20 wt %.

Figure 2:
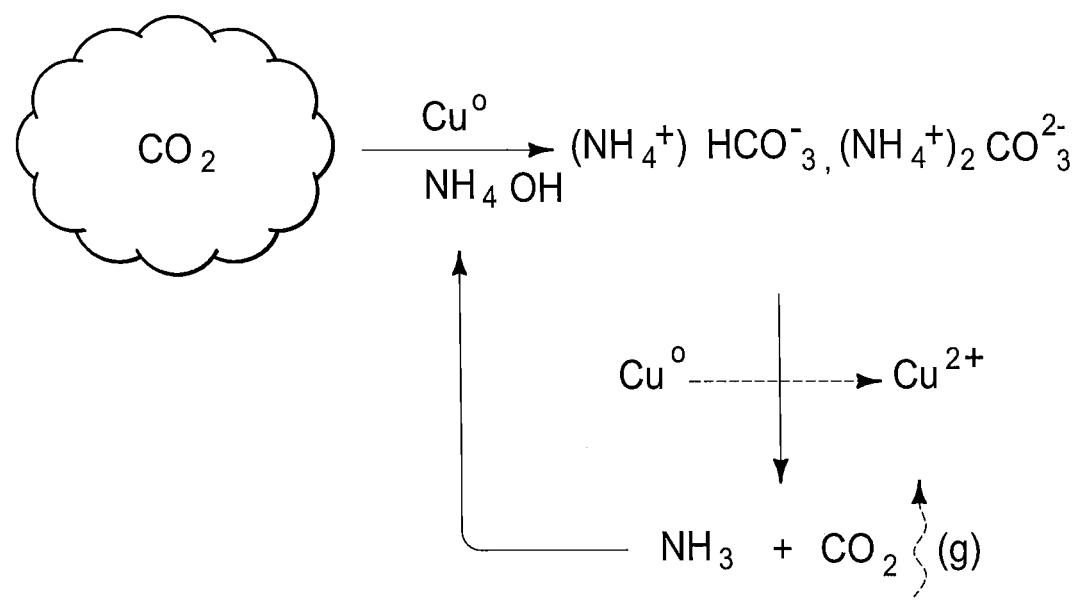
FIG. 2 is an example chemical representation of the removal of gas or components of a gaseous mixture according to an embodiment.

In accordance with example implementations and with reference to FIG. 2, the ligand can be $NH_3$ and the metal can be copper. A gas source having $CO_2$ therein, for example, can be exposed to the solution that includes at least both copper in its solid state, as well as $NH_4OH$, for example. This can produce a complex of $NH_4^+$ and bicarbonate and/or as well as $NH_4^+$ and carbonate. In accordance with example implementations, the molar ratio of the $NH_4^+$ to copper can be substantially greater than or equal to 2:1.

Figure 3:
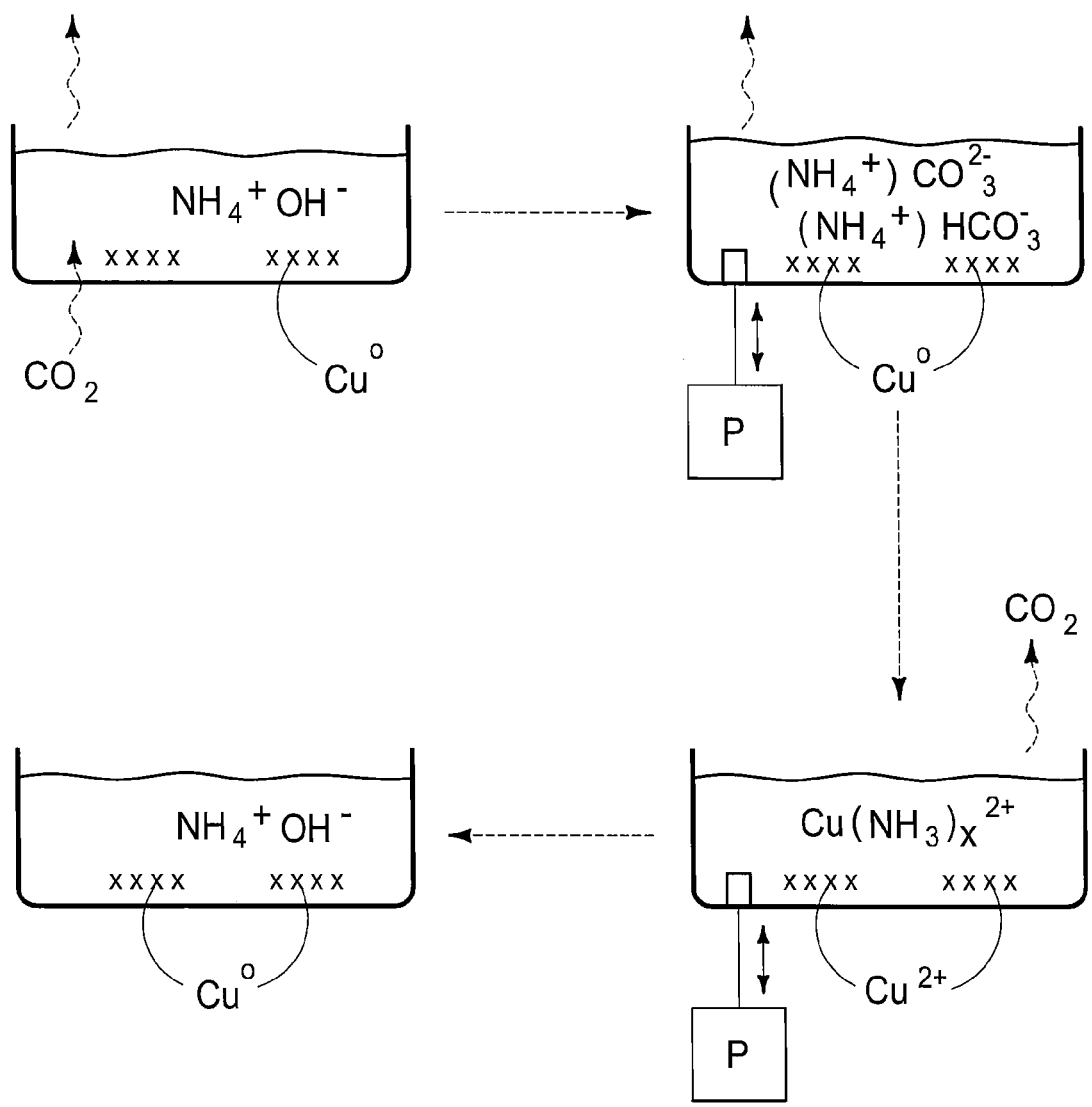
FIG. 3 is an alternative embodiment of a series of configurations of a system for removing components of a gaseous mixture according to an embodiment.

Referring next to FIG. 3, a method for removing a component of a gas mixture can include exposing the gas mixture to a solution containing a ligand and a reactive metal, with the exposing chemically binding the component of the gaseous mixture to the ligand. As an example and with reference to FIG. 3, a gaseous mixture including $CO_2$ can be exposed to a solution that includes $NH_4OH$ and copper. Within that solution, $^-OH$ can chemically bind with $CO_2$ to form bicarbonate or carbonate, thereby trapping the $CO_2$ within the solution.

In certain circumstances, this $CO_2$ can be a component of a gas mixture that includes nitrogen, for example. In other examples, this $CO_2$ can be a component of an effluent such as a combustion effluent. In accordance with example implementations, during the trapping of the component of the gaseous mixture, the metal can have a relatively low oxidation state in comparison to its higher oxidation state. For example, copper can have a zero oxidation state during the exposing, but during the releasing of the component, a $2^+$ oxidation state. The gaseous mixture exposed to the solution can be about 24,000 volume % of the fluid, for example. The gaseous component of the gaseous mixture can be from about 0.1 to about 50 volume % of the gaseous mixture.

The oxidation state of the metal within the fluid can be changed to a higher oxidation state, thereby releasing the $CO_2$ from being chemically bound to a ligand such as $NH_3(NH_4OH)$. This oxidation state can be raised by providing an oxidizing potential via an electrode exposed to the solution phase of the fluid.

Figure 4:
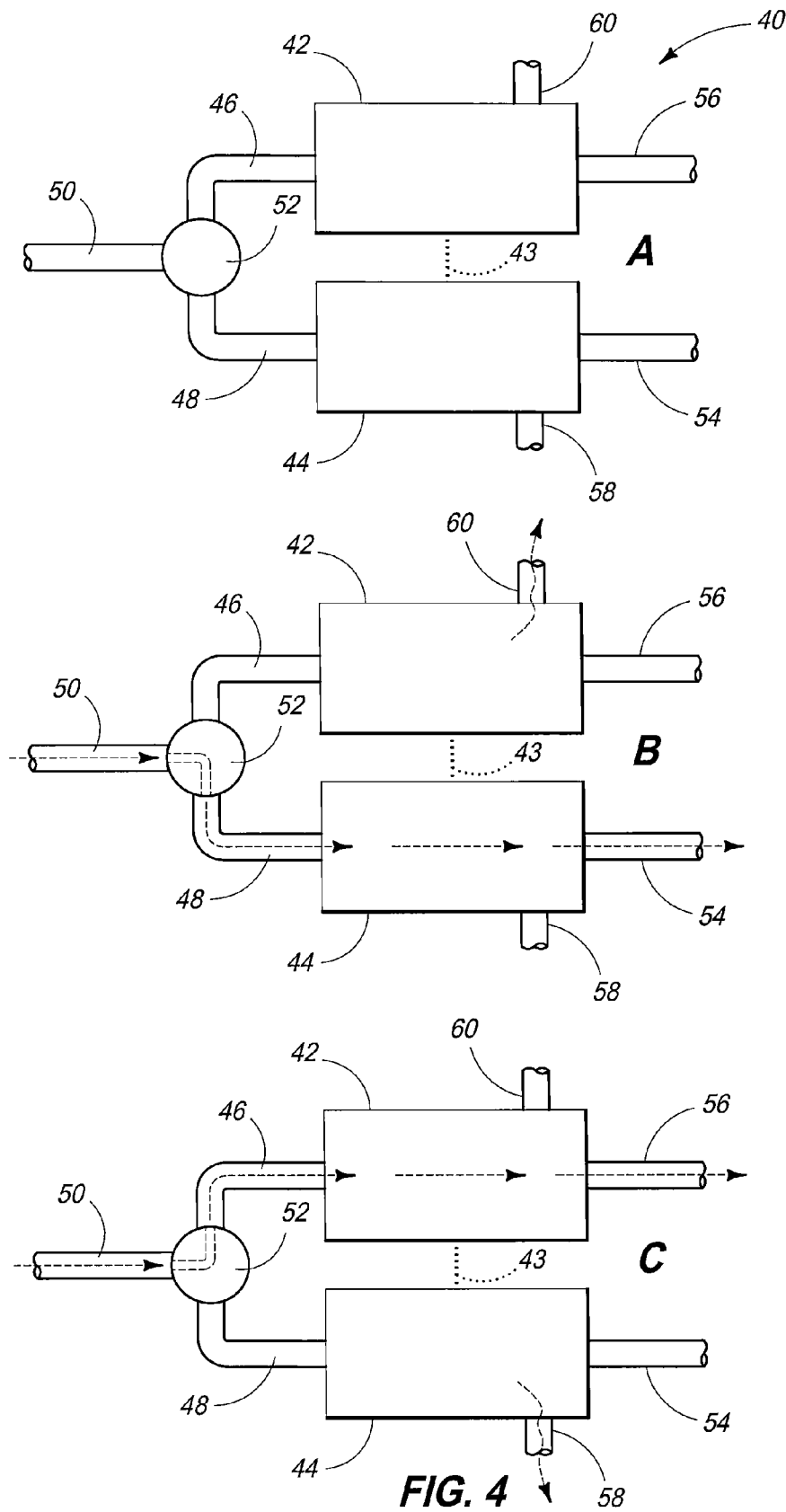
FIGS. 4A-4C are embodiments of a system at different configurations for removing components of a gas mixture according to an embodiment.

Referring to FIG. 4, a method for capturing a component of a gas mixture is described with reference to systems 40 in alternative configurations. With reference to FIG. 4A, for example, system 40 can include at least two reactors 42 and 44. Reactors 42 and 44 can be configured as described with reference to system 10 in FIG. 1. The reactors can include a power source. The reactors can be lined with a nonconductive material, and they can house a solution that contains both a ligand and a metal, for example.

In accordance with another example implementation, reactors 42 and 44 can be associated with one another in a configuration that provides for the exchange of electrons. Such association can be a link or bridge 43, for example, that connects reactors 42 and 44 to allow connection via ionic conductivity while preventing bulk mixing. Example links or bridges can be, but are not limited to: ion conductive membranes, salt bridges, and/or conductive materials. In accordance with example implementations, as the oxidation state of the solution within reactor 42 changes, the oxidation state of the solution with reactor 44 may also change accordingly; and vice-versa.

Entering these reactors can be inlet lines 46 and 48 which can join and be in fluid connection with inlet line 50. The direction of the fluid flow from 50 to either lines 46 or 48 can be dictated utilizing valve 52, for example. Reaction vessels 42 and 44 can also include outlets 54, 56, 58, and 60, for example. Referring to FIG. 4B, a gaseous mixture can be provided to reactor 44 and this gaseous mixture and a component of that gaseous mixture can be retained, allowing a portion of that gaseous mixture to exit reactor 44 without the retained component. Simultaneously, if desired, reactor 42 can be configured to allow a previously retained gaseous component to exit via outlet 60.

According to example implementations, it is possible to arrange the electrical potential of reactor 44 different than that of reactor 42, thereby allowing the oxidation state of the metal within the liquid phases within each of these reactors to be different. As an example, the oxidation state of the metal with reactor 42 should be a higher state, while the oxidation state of the metal within reactor 44 should be at a lower state. In accordance with example implementations, the component can be captured from outlet 60. This component can be $CO_2$ and the mixture can be a mixture of $CO_2$ and nitrogen, or $CO_2$ as a portion of a combustion effluent or byproduct.

Referring next to FIG. 4C, after depletion of the fluid within reactor 44 by binding the fluid of reactor 44 with a component to be isolated, the intake of mixture 50 can be switched to reactor 42 which had previously undergone the removal of the component to be isolated, thereby preparing the reaction vessel to accept additional gas mixture within reaction vessel 42. This can be a process of returning the oxidation state to the previous state. In this configuration, the oxidation state in reactor 42 is different than that of the oxidation state in reactor 44. In accordance with example implementations, this can be a return of the reactor of the metal's oxidation state to a point before it was altered to either accept or release the component to be isolated, such as $CO_2$, for example.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method of capturing a component of a gaseous mixture, the method comprising:
    exposing the gaseous mixture to an aqueous fluid containing a ligand and a reactive metal, the exposing chemically binding the component of the gaseous mixture to the ligand, wherein the fluid exists about an electrode;
    using the electrode to alter the oxidation state of the metal to unbind the component from the ligand;
    and capturing the component, wherein the component is carbon dioxide.

2. The method of claim 1 wherein the ligand is $NH_3$ and the metal is Cu.

3. The method of claim 2 wherein the carbon dioxide is chemically bound to $NH_4OH$.

4. The method of claim 3 wherein the altering the oxidation state of the metal releases the carbon dioxide from the $NH_4OH$.

5. The method of claim 1 further comprising returning the oxidation state of the metal to the state before it was altered.

6. The method of claim 5 further comprising again exposing the gaseous mixture to the aqueous fluid.

* * * * *